United States Patent
Kole (10) Patent No.: US 11,073,226 B2
(45) Date of Patent: Jul. 27, 2021

(54) SANITARY FAUCET HANDLE HAVING MULTIPLE GRASPING REGIONS

(71) Applicant: RK INVENTIONS, LLC, Glencoe, IL (US)

(72) Inventor: Ryan Kole, Glencoe, IL (US)

(73) Assignee: RK INVENTIONS, LLC, Glencoe, IL (US)

( * ) Notice: Subject to any disclaimer, the term of this patent is extended or adjusted under 35 U.S.C. 154(b) by 0 days.

(21) Appl. No.: 15/852,319

(22) Filed: Dec. 22, 2017

(65) Prior Publication Data

US 2018/0216750 A1    Aug. 2, 2018

Related U.S. Application Data

(62) Division of application No. 13/130,613, filed as application No. PCT/US2009/065492 on Nov. 23, 2009, now Pat. No. 9,903,506.

(60) Provisional application No. 61/117,232, filed on Nov. 23, 2008.

(51) Int. Cl.
   *F16K 31/60*    (2006.01)

(52) U.S. Cl.
   CPC .......... *F16K 31/605* (2013.01); *F16K 31/607* (2013.01); *Y10T 137/8158* (2015.04); *Y10T 137/9464* (2015.04)

(58) Field of Classification Search
   CPC ...... F16K 31/60; F16K 31/602; F16K 31/607; F16K 11/205; F16K 11/206; E03C 1/0412; Y10T 137/8158; Y10T 137/9464
   USPC ...... 137/315.15, 801; 251/289, 293; 74/123; 16/422, 426, 427, 430; 4/675, 676, 677, 4/678
   See application file for complete search history.

(56) References Cited

U.S. PATENT DOCUMENTS

| | | | |
|---|---|---|---|
| 944,534 A * | 12/1909 | Beaman | G05G 1/085 24/11 CC |
| 1,345,748 A * | 7/1920 | Clover | F24H 1/102 392/475 |
| 1,512,702 A * | 10/1924 | McCarty | F16K 31/60 251/291 |

(Continued)

FOREIGN PATENT DOCUMENTS

GB    188536 A  * 11/1922  ............. F16K 31/60

*Primary Examiner* — William M McCalister (74) *Attorney, Agent, or Firm* — Patzik, Frank & Samotny Ltd.

(57) ABSTRACT

A sanitary water faucet handle has multiple levers, or grasping regions. Each lever includes an associated indicator, identifying whether the particular grasping region is intended for use in turning the faucet's water supply on, or off. The indicator may be in the form of indicia applied to a portion of at least one of the levers, a coloration of at least one of the levers, a variation in the relative length of at least one of the levers, or a variation of the height of at least one of the levers relative to a bottom surface of the handle. The handle is attachable to a conventional water valve, permitting the handle to be retrofitted as a replacement handle in existing faucet systems. A supplemental lever or grasping region may be attachable or releasably attachable to a preexisting lever of a faucet system. A powered faucet lever may be provided that reconfigures itself to automatically present one of two separate sets of grasping regions, depending upon whether the associated faucet is activated or deactivated.

5 Claims, 6 Drawing Sheets

(56) References Cited

U.S. PATENT DOCUMENTS

| | | | | |
|---|---|---|---|---|
| 1,634,781 A * | 7/1927 | Everett | F16K 47/04 | 137/553 |
| 1,724,131 A * | 8/1929 | Gavaza | F16L 37/48 | 285/354 |
| 2,142,791 A * | 1/1939 | Koza | F16K 31/60 | 137/551 |
| D159,565 S * | 8/1950 | Wangelin | D7/398 | |
| 2,573,716 A * | 11/1951 | Kirtley | F16K 11/18 | 137/636 |
| 2,892,612 A * | 6/1959 | Stoian | F16K 31/52408 | 251/232 |
| 3,122,756 A * | 3/1964 | Bradley | F16K 1/523 | 251/285 |
| 3,207,472 A * | 9/1965 | Seltsam | F16K 41/103 | 251/331 |
| 3,396,749 A * | 8/1968 | Troutman | F16K 19/00 | 137/603 |
| 4,266,320 A * | 5/1981 | Grant | E03B 9/02 | 16/427 |
| 4,344,452 A * | 8/1982 | Sato | F16K 31/60 | 137/238 |
| 4,349,940 A * | 9/1982 | Fleischmann | E05B 1/00 | 16/110.1 |
| 4,429,855 A * | 2/1984 | Buffone | F16K 27/07 | 137/556 |
| 4,456,222 A * | 6/1984 | Shen | F16K 31/52425 | 137/801 |
| 4,804,010 A * | 2/1989 | Meissenburg | E03C 1/04 | 137/216 |
| 5,482,251 A * | 1/1996 | Roberts | F16K 5/0647 | 251/288 |
| 5,711,329 A * | 1/1998 | Soon | E03C 1/0412 | 134/115 R |
| 6,230,769 B1 * | 5/2001 | O'Brien | B67D 1/06 | 137/378 |
| D512,487 S * | 12/2005 | Kulig | D23/252 | |
| 7,055,185 B1 * | 6/2006 | Deveer | E03D 9/08 | 4/420.4 |
| D717,920 S * | 11/2014 | Rexach | D23/252 | |
| D774,168 S * | 12/2016 | Potter | D23/250 | |
| 2007/0023094 A1 * | 2/2007 | Young | E03C 1/0404 | 137/801 |
| 2009/0000024 A1 * | 1/2009 | Louis | E03C 1/046 | 4/676 |
| 2010/0043898 A1 * | 2/2010 | Eckhaus | E03C 1/04 | 137/625 |
| 2010/0148105 A1 * | 6/2010 | Reckker | B25G 1/04 | 251/293 |
| 2010/0288365 A1 * | 11/2010 | McEnaney | E03C 1/0412 | 137/1 |
| 2011/0220223 A1 * | 9/2011 | Kole | F16K 31/605 | 137/551 |
| 2013/0248006 A1 * | 9/2013 | Clifford | G05D 16/0666 | 137/15.19 |

* cited by examiner

SANITARY FAUCET HANDLE HAVING MULTIPLE GRASPING REGIONS

CROSS-REFERENCE TO RELATED APPLICATION

This application is a division of U.S. application Ser. No. 13/130,613, filed May 23, 2011, the entirety of which is hereby incorporated by reference, which is a national stage entry of international application No. PCT/US09/65492, filed Nov. 23, 2009, the entirety of which is hereby incorporated by reference, which claims the benefit of U.S. Provisional Patent Application No. 61/117,232, filed Nov. 23, 2008, the entirety of which is incorporated herein by reference.

BACKGROUND OF THE INVENTION

1. Field of the Invention

The present invention relates, in general, water faucets and, more particularly, to the handles associated with valves coupled to water faucets, for the activation and deactivation of the supply of water thereto.

2. General Background of the Invention

Water faucets, such as those typically employed in restrooms and kitchens, include a variety of basic design types, including ball-type faucets, disc-type faucets, cartridge-type faucets, and compression-type faucets. Examples of each of these types of faucets may be found, for example, in U.S. Pat. Nos. 5,740,836, 3,736,959, 3,943,967, and 4,1344,20, respectively, the entirety of each of which U.S. patents are hereby incorporated by reference. In other faucet designs, manually pressing down upon an actuator commands the faucet to emit water for a predetermined period of time.

According to the U.S. Centers for Disease Control and prevention, sanitation and hygiene are critical to health, survival, and development, and a significant amount of disease could be prevented through better access to adequate sanitation facilities and better hygiene practices. For example, throughout the world, infectious diarrhea, which may be caused by viruses, parasites and bacteria, is a leading cause of disease and death. Most recently, the epidemic levels reached by the H1N1 influenza virus has caused considerable concern.

According to a 2007 study by the Hygiene Council and funded by Reckitt Benckiser, the kitchen faucet handle and the bathroom faucet handle are the sixth and seventh locations in U.S. homes having the highest concentration of bacteria, containing 13,227 and 6,267 bacteria per square inch, respectively.

People are often trained from a young age to wash their hands when dirty and after using the restroom. Typically, when washing the hands in a sink having a conventional water faucet, the user turns the water on by turning a sink handle, applies soap to the hands and lathers by rubbing the hands together, rinse the soap off of the hands, and the turns the sink handle once again to turn off the water. Upon doing so, the user is touching and grasping the very same handle, in the very same, potentially unsanitary condition, as it was immediately prior to washing the hands.

In the past, certain approaches have been tried to inhibit the transmission of have bacteria and viruses via unsanitary water faucet handles. For example, proximity sensors have been employed proximate water faucets to turn the water on and off automatically when hands are placed beneath, and subsequently removed from, the faucet. While effective in removing the requirement to touch a faucet handle when washing, such automatic systems are relatively costly expensive to implement initially, or to retrofit existing systems, and require a source of electrical energy to power the sensor and associated valve actuator. Moreover, such automated systems typically do not enable the user to control the temperature of the water or the pressure of the water that is dispensed.

Another approach that has been employed is the use of a foot-actuated pedal to control the flow of water from a faucet. Such foot-operated systems are again relatively costly to implement (as compared to conventional systems), typically do not permit the user to adjust water temperature and pressure, and are not considered aesthetically pleasing to many.

Yet another approach are systems that include water flow actuators wherein the user presses down on a knob in order to initiate a flow of water for a predetermined period of time. This may be troublesome to many, however, as the time allotted for water flow may be considered too short requiring the user to push the handle down many times during a single hand washing, potentially contaminating the hands with each supplemental press of the actuator. Moreover, such press-type systems may be relatively expensive to retrofit into existing installations.

BRIEF SUMMARY OF THE INVENTION

The present invention comprises a sanitary water faucet handle having multiple levers, or grasping regions. Each grasping region includes an associated indicator, identifying whether the particular grasping region is intended for use in turning the faucet's water supply on, or off. The faucet handle employs a standard means of attachment, such as a bore and fixation screw, for securing of the faucet handle to an associated valve. An indicator is associated with at least one lever to identify whether the lever is to be used solely to turn on, or solely to turn off, an associated water valve. In certain embodiments of the present invention, a supplemental lever or grasping region is attachable or releasably attachable to an existing faucet lever. In another embodiment of the present invention, a powered faucet lever reconfigures itself to automatically present one of two separate groups grasping regions, depending upon whether the associated faucet is activated or deactivated. Each embodiment of the present invention encourages the user to grasp one portion of a water faucet handle prior to commencing hand washing, and another portion of the water faucet once the hands have been cleansed. In this manner, the spread of bacteria and viruses from user to user via water faucet handles, including the spread of potentially deadly pathogens such as the H1N1 influenza virus, may be significantly reduced, potentially saving innumerable lives.

DETAILED DESCRIPTION OF THE INVENTION

While the present invention is susceptible of embodiment in many different forms, there is shown in the drawings and will herein be described in detail, several specific embodiments, with the understanding that the present disclosure is intended as an exemplification of the principles of the present invention and is not intended to limit the invention to the embodiments illustrated. Within the various illustrated embodiments, common reference numerals have been assigned to similar or analogous elements and components.

Figure 1A:
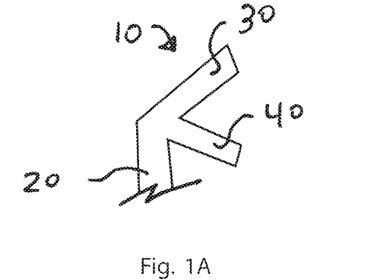
FIG. 1A is a simplified side elevational view of a first embodiment of the present invention.
Figure 1B:
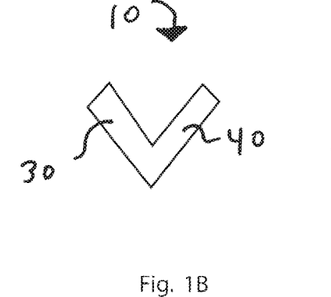
FIG. 1B is a simplified top view of the embodiment of FIG. 1A.
Figure 1C:
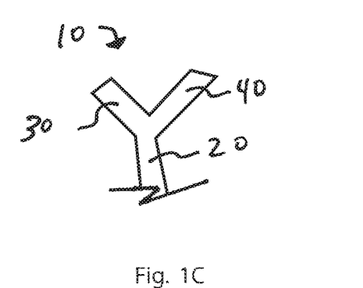
FIG. 1C is a simplified front elevational view of the embodiment of FIG. 1A.

A first embodiment of the present invention, having a substantially V-shaped lever configuration, is shown in FIGS. 1A through 1C as comprising handle 10, having handle body 20, first lever, or gripping region 30, and second lever, or gripping region 40. Handle body 20 includes convention means for attachment of handle 10 to an associated valve mechanism, such as a valve stem assembly thereof, such as via an associated retaining screw or setscrew.

Figure 2:
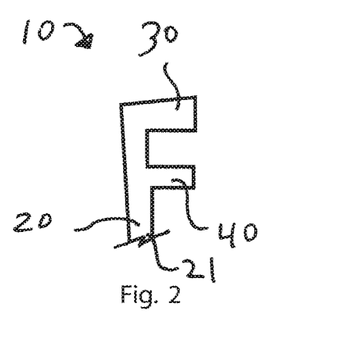
FIG. 2 is a simplified front elevational view of a second embodiment of the present invention.

A second embodiment of the present invention, having a substantially F-shaped lever configuration, is shown in FIG. 2. In this embodiment, the differing height of each lever 30, 40 vertically above a bottom surface 21 of handle body 20 serves as an indicator that the particular lever is to be used solely to turn on, or activate, the associated water valve (or, alternatively, solely to turn off the valve).

Figure 3:
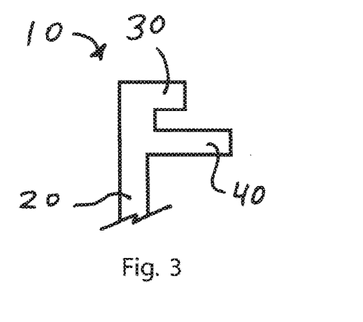
FIG. 3 is a simplified front elevational view of a third embodiment of the present invention.

A third, modified form of the embodiment of FIG. 2 is shown in FIG. 3. In this embodiment, lever 30 is shorter in length than lever 40. The shorter length of lever 30 (or, alternatively considered, the longer length of lever 40) serves, in addition to the increased height of lever 30 (as compared to lever 40) as an additional indicator that this lever is to be used solely to turn on, or activate, the associated water valve (or, alternatively, solely to turn off the valve).

Figure 4:
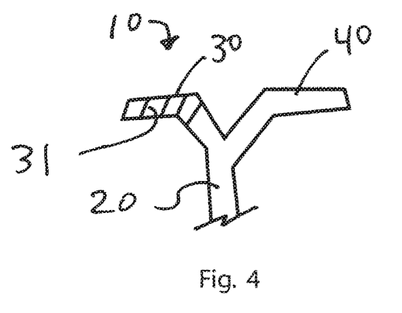
FIG. 4 is a simplified front elevational view of a fourth embodiment of the present invention.

A fourth embodiment of the present invention is shown in FIG. 4. In this embodiment, lever 30 includes a textured surface 31 (such as, for example, a knurled surface, or a surface having a series of ringed indentations). Textured surface 31 serves as an indicator that lever 30 is to be used solely to activate, or to deactivate, the water valve to which handle 10 is attached via handle body 20. Although FIG. 4 shows only one of lever 30 and lever 40 having a textured surface, it is also contemplated that both levers 30 and 40 may be textured. When both levers are textured, each preferably includes a manner of texturing, such as knurling or ringed indentations, that are highly distinguishable from each other, so that it is apparent to the user that one textured lever is solely for turning on an associated valve, and the other is solely for turning off the same valve.

Figure 5:
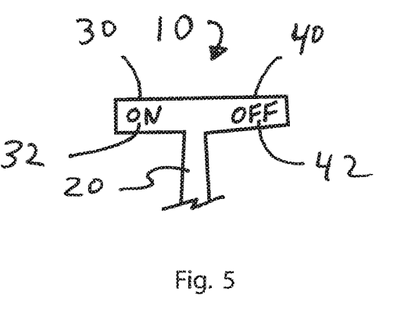
FIG. 5 is a simplified front elevational view of a sixth embodiment of the present invention.

A fifth embodiment of the present invention, having a substantially T-shaped configuration, is shown in FIG. 5. In this embodiment, each lever 30, 40 includes associated indicia 32, 42, as an indicator as to whether the particular lever is to be grasped and used solely to turn on, or to turn off, an associated valve. Indicia 32 and 42 may be engraved or embossed into the surface of handle 10, or may comprise raised surfaces attached to or integrally formed with handle 10. Although, in the example of FIG. 5, indicia 32 comprises the word "ON" and indicia 42 comprises the word "OFF", other indicia, including "0" and "1" (i.e., binary signals"), or universal graphical symbols for on (i.e., a circle) and off (i.e., a vertical line within a circle) as defined in the well known IEC 60417 standard, entitled Graphical Signals For Use On Equipment. Moreover, translations of "on" and "off" in other languages may alternatively be employed for indicial 32 and 42.

Figure 6:
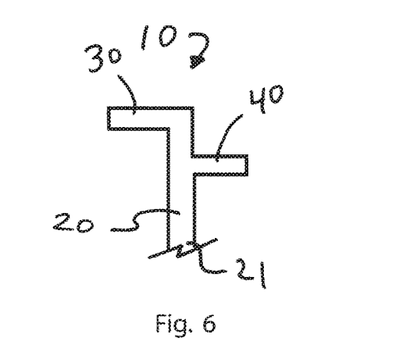
FIG. 6 is a simplified front elevational view of a sixth embodiment of the present invention.
Figure 7:
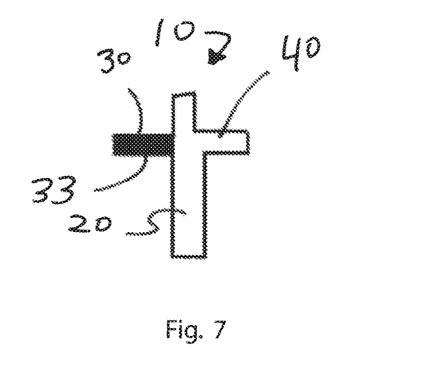
FIG. 7 is a simplified front elevational view of a seventh embodiment of the present invention.

A sixth embodiment of the present invention is shown in FIG. 6. In this embodiment, a "staggered-T" shape is employed (as compared to FIG. 5), with opposing levers 30 and 40 being at different heights relative to bottom surface 21 if handle body 20. As with the embodiment of FIG. 2, the differing height of each lever 30, 40 vertically above a bottom surface 21 of handle body 20 serves as an indicator that the particular lever is to be used solely to turn on, or activate, the associated water valve (or, alternatively, solely to turn off the valve). Moreover, differently length levers 30 and 40, as in the embodiment of FIG. 3, may additionally be employed in this embodiment as well as further indication of the relative functions of each lever.

A seventh, substantially cross-shaped embodiment of the present invention is shown in FIG. 6. In this embodiment, a color variation is employed in association with at least one lever as an indicator of the lever's function. As shown in FIG. 30, at least a portion of handle 30 has a colored region 33, serving as an indicator that lever 30 is to be used solely to activate, or to deactivate, the water valve to which handle 10 is attached via handle body 20. Colored region may comprise an integral coloring of a portion of handle 10 at lever 30, paint or other colored coating applied to the surface of lever 30, or a colored covering surrounding a portion of lever 30. Moreover, portions of both lever 30 and 40 may be given different, contrasting or complimentary colors. For example, at least a portion of lever 30 may be colored green, indicating that lever 30 is to be used solely to turn on, or activate, the associated water valve, while at least a portion of lever 40 may be colored red, indicating that lever 40 is to be used solely to turn off, or deactivate, the associated water valve.

Figure 8:
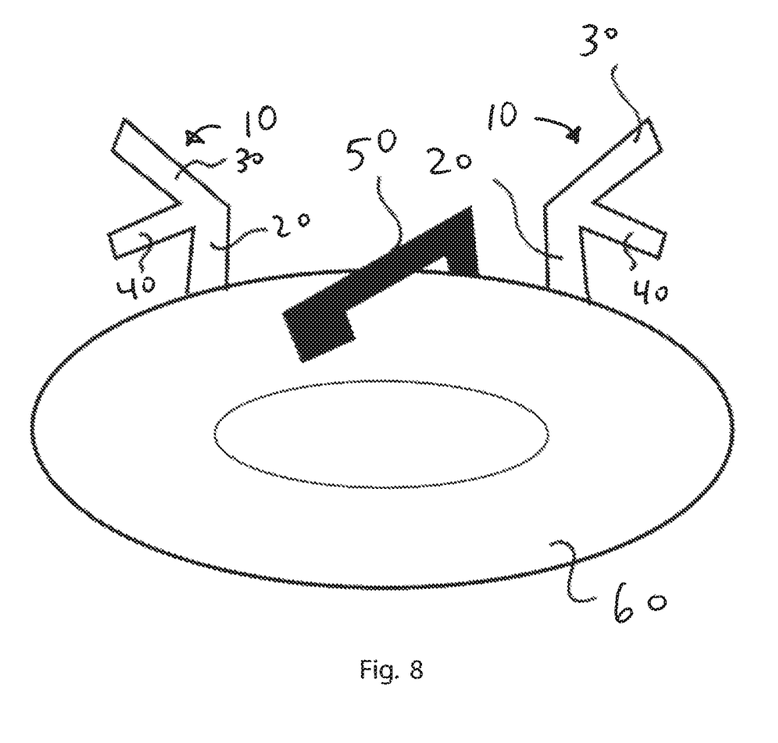
FIG. 8 is a simplified front perspective view of a sink and faucet employing two handles of the present invention in conjunction with separately controlled hot and cold water valves.

Two handles 10 of the present invention are shown in conjunction with a double-handled faucet system in FIG. 8. In such installations, one handle 10 is associated with a hot water valve coupled with faucet 50 (shown disposed above sink or wash basin 60), while another handle 20 is associated with a cold water valve, also coupled to faucet 50.

Figure 9:
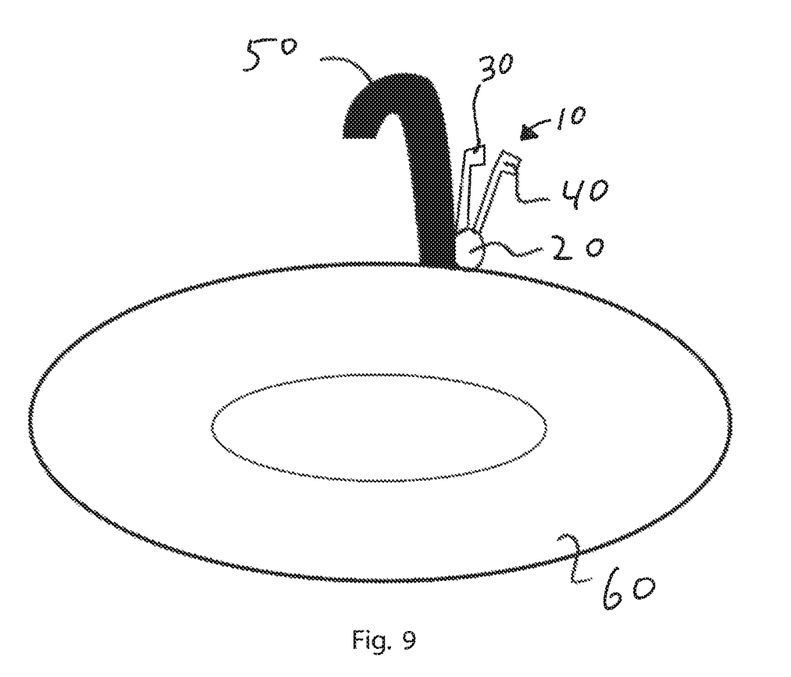
FIG. 9 is a simplified front perspective view of a sink and faucet employing a single handle of the present invention in conjunction with commonly controlled hot and cold water valves.

A single handle 10 of the present invention is shown in conjunction with a single-handled faucet system in FIG. 9. In such installations, a single handle 10 is both pivoted and swiveled and to control both the intensity of water flow and the relative mixing of hot and cold water that is fed to faucet 50.

As can be seen, the handles of the present invention can be easily retrofitted into existing single-handled and double-handled faucet systems by replacing the existing handle or handles with those of the present invention. The handles of the present invention can further be included in newly installed systems. In either case, the handles of the present invention are suitable for use in bathrooms and kitchens of the home, as well as in restaurants, hotels, hospitals, schools, and other locations. The cost of adding an additional lever to a sink handle is minimal. The effects of this around the world are infinite.

Inasmuch as each user of a faucet of the present invention should only touch the lever indicated as being the "off" lever following complete washing of the hands, the risk of spread of bacteria and viruses, and, in turn, disease and infection to others, may be significantly reduced.

Several variations of an eighth embodiment of the present invention is shown in FIGS. 10 through 13 as comprising auxiliary lever or grasping region 70, and two opposing prongs or clip members 71 at a proximal end of faucet handle 10. Clip members 71 permit auxiliary lever 70 to be clipped on to a suitable cooperating portion of a handle or handle lever that is already installed as a part of an overall faucet system, by providing a secure yet releasably attachable press-fit, once clipped in place. Moreover, a substantially water insoluble adhesive or epoxy may be employed to enhance and make substantially permanent the securement of handle 10 to an existing faucet handle or lever thereof. Once attached, auxiliary lever 70 may be grasped by a user to either activate or deactivate the handle (and, in turn, the water valve) to which it is attached.

Figure 10:
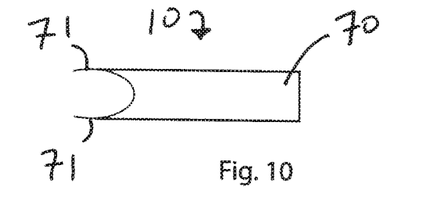
FIG. 10 is a simplified top plan view of a top plan view of an eight embodiment of the present invention.

In FIG. 10, the presence of attached auxiliary lever 70, and the differences in appearance between auxiliary lever and the preexisting lever that it is attached to, serves as an indicator that auxiliary lever 70 is to be used solely to turn on, or activate, the associated water valve (or, alternatively, solely to turn off the valve).

Figure 11:
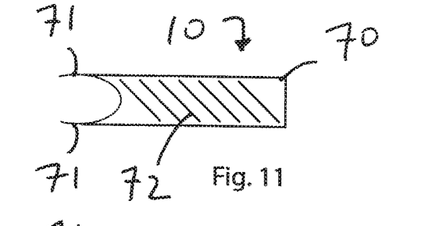
FIG. 11 is a simplified top plan view of the eighth embodiment of the present invention and showing, in particular, a textured surface thereof.

In FIG. 11, auxiliary lever 70 includes a textured surface region 72 (such as, for example, a knurled surface, or a surface having a series of ringed indentations). Textured surface region 72 serves as an indicator that auxiliary lever 70 is to be used solely to activate, or to deactivate, the associated water valve (or, alternatively, solely to turn off the valve).

Figure 12:
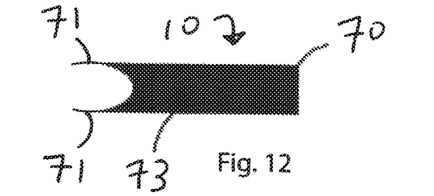
FIG. 12 is a simplified top plan view of the eighth embodiment of the present invention and showing, in particular, a colored surface thereof.

In FIG. 12, auxiliary lever 70 includes a colored surface region 73, serving as an indicator that auxiliary lever 70 is to be used solely to activate, or to deactivate, an associated water valve. Colored surface region 73 may comprise an integral coloring of a portion of auxiliary lever 70, paint or other colored coating applied to the surface of auxiliary lever 70, or a colored covering surrounding a portion of auxiliary lever 70.

Figure 13:
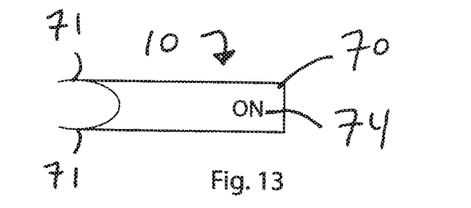
FIG. 13 is a simplified top plan view of the eighth embodiment of the present invention and showing, in particular, indicia associated therewith.

In FIG. 13, auxiliary lever 70 includes indicial 74 applied to at least a portion of the auxiliary lever, as an indicator as to whether the particular lever is to be grasped and used solely to turn on, or to turn off, an associated valve. Indicia 74 may be engraved or embossed into the surface of handle 10, or may comprise raised surfaces attached to or integrally formed with handle 10. Although, in the example of FIG. 13, indicia 74 comprises the word "ON" other indicia, including the word "OFF", "0" and "1" (i.e., binary signals"), or universal graphical symbols for on (i.e., a circle) and off (i.e., a vertical line within a circle) as defined in the well known IEC 60417 standard, entitled Graphical Signals For Use On Equipment. Moreover, translations of "on" and "off" in other languages may alternatively be employed for indicial 74.

Several variations of an ninth embodiment of the present invention is shown in FIGS. 14 through 17 as comprising auxiliary lever or grasping region 70, and two opposing strap ends 75 and 76, each extending from at a proximal end of faucet handle 10. Each opposing strap end 75, 76 includes a portion of a cooperating fastener, such as, for example, a hook-and-loop type fastener, such as the type sold under the VELCRO trademark. Strap ends 75 and 76, and their associated cooperating fastener, permit auxiliary lever 70 to be releasably attached on to a suitable cooperating portion of a handle or handle lever that is already installed as a part of an overall faucet system, by providing a secure yet releasably attachable fixation, once strap ends 75 and 76 are placed in an overlapping configuration, permitting their associated fastener portions to adhere together at overlapping region 77. Once so attached, auxiliary lever 70 may be grasped by a user to either activate or deactivate the handle (and, in turn, the water valve) to which it is attached.

Figure 14:
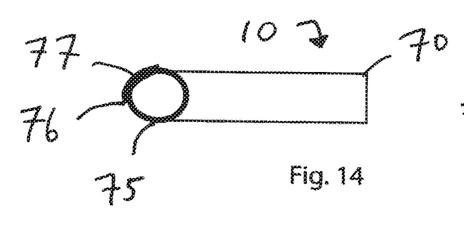
FIG. 14 is a simplified top plan view of a ninth embodiment of the present invention.

In FIG. 14, the presence of attached auxiliary lever 70, and the differences in appearance between auxiliary lever and the preexisting lever that it is attached to, serves as an indicator that auxiliary lever 70 is to be used solely to turn on, or activate, the associated water valve (or, alternatively, solely to turn off the valve).

Figure 15:
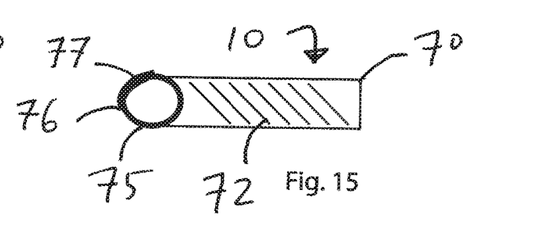
FIG. 15 is a simplified top plan view of the ninth embodiment of the present invention and showing, in particular, a textured surface thereof.

In FIG. 15, auxiliary lever 70 includes a textured surface region 72 (such as, for example, a knurled surface, or a surface having a series of ringed indentations). Textured surface region 72 serves as an indicator that auxiliary lever 70 is to be used solely to activate, or to deactivate, the associated water valve (or, alternatively, solely to turn off the valve).

Figure 16:
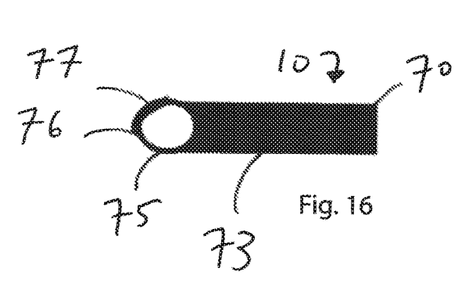
FIG. 16 is a simplified top plan view of the ninth embodiment of the present invention and showing, in particular, a colored surface thereof.

In FIG. 16, auxiliary lever 70 includes a colored surface region 73, serving as an indicator that auxiliary lever 70 is to be used solely to activate, or to deactivate, an associated water valve. Colored surface region 73 may comprise an integral coloring of a portion of auxiliary lever 70, paint or other colored coating applied to the surface of auxiliary lever 70, or a colored covering surrounding a portion of auxiliary lever 70.

Figure 17:
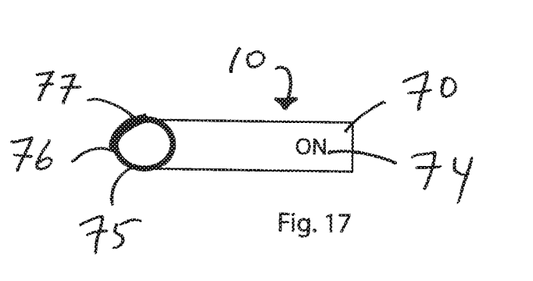
FIG. 17 is a simplified top plan view of the ninth embodiment of the present invention and showing, in particular, indicia associated therewith.

In FIG. 17, auxiliary lever 70 includes indicial 74 applied to at least a portion of the auxiliary lever, as an indicator as to whether the particular lever is to be grasped and used solely to turn on, or to turn off, an associated valve. Indicia 74 may be engraved or embossed into the surface of handle 10, or may comprise raised surfaces attached to or integrally formed with handle 10. Although, in the example of FIG. 17, indicia 74 comprises the word "ON" other indicia, including the word "OFF", "0" and "1" (i.e., binary signals"), or universal graphical symbols for on (i.e., a circle) and off (i.e., a vertical line within a circle) as defined in the well known IEC 60417 standard, entitled Graphical Signals For Use On Equipment. Moreover, translations of "on" and "off" in other languages may alternatively be employed for indicial 74.

A tenth embodiment of the present invention, comprising an electrically powered, automatically reconfiguring lever is shown in FIGS. 18A through 18E as comprising two rotating members 90 and 100. Rotating member 90 includes first grasping region 80 having an associated indicator, such as indicia 81, and third grasping region 84 having an associated indicator, such as indicia 85. Rotating member 100 includes second grasping region 82 having an associated indicator, such as indicia 83, and fourth grasping region 86 having an associated indicator, such as indicia 87. A concealed battery and miniature motor or motors within handle 10 cooperate with sensors to reconfigure rotating members 90 and 100 at appropriate times, so that certain surfaces of handle 10 are initially presented to the user prior to commencing hand washing, and different surfaces of handle 10 are subsequently presented to the user for turning off the water supply once the hands have been cleansed.

Figures 18A, 18B:
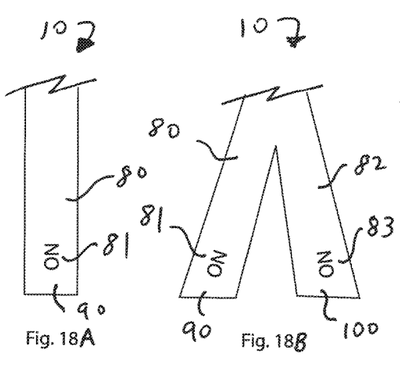
FIG. 18A is a simplified top plan view of a tenth embodiment of the present invention and showing, in particular, the handle in a first configuration.
FIG. 18B is a simplified top plan view of the tenth embodiment of the present invention and showing, in particular, the handle in transition between the first configuration and a second configuration.

Referring to the initial configuration of FIG. 18A, rotating members 90 and 100 are positioned such that grasping regions 84 and 86 are facing towards each other, and thus hidden, while grasping regions 80 and 82 are facing away from each other, and are thus exposed to the user, together with their associated indicators 81 and 83. The exposure of indicators 81 and 83 indicate to the user that handle 10 is to be grasped and rotated or moved in order to turn on, or activate, an associated water valve.

A pressure transducer, capacitive touch sensor, optical sensor, or other suitable sensor is associated with each of rotating members 90 and 100, and detects when a user has grasped handle 10 in order to activate the water supply. Alternatively, an optical, mechanical, or electromechanical switch or position encoder may be employed to detect when handle 10 has been moved from an inactive to an active orientation.

Figures 18C, 18D, 18E:
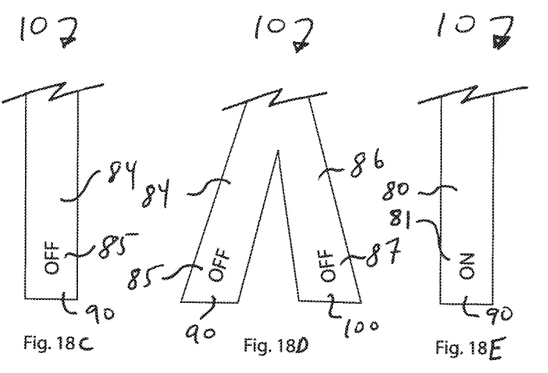
FIG. 18C is a simplified top plan view of the tenth embodiment of the present invention and showing, in particular, the handle in a second configuration.
FIG. 18D is a simplified top plan view of the tenth embodiment of the present invention and showing, in particular, the handle in transition while returning from the second configuration to the first configuration.
FIG. 18E is a simplified top plan view of the tenth embodiment of the present invention and showing, in particular, the handle fully returned to the first configuration.

Upon detection by any of the above-described means that the user has recently grasped handle 10 to turn on the water supply, the motor or motors concealed within handle 10 are activated, initiating, through a direct drive arrangement or suitable gearing mechanisms, the rotation of rotating members 90 and 100, as shown in FIG. 18B. In particular, grasping regions 80 and 82 are rotated towards each other, until the configuration of FIG. 18C is reached, at which time the concealed motor or motors are deactivated. In this configuration, rotating members 90 and 100 are positioned such that grasping regions 80 and 82 are facing towards each other, and thus hidden, while grasping regions 84 and 86 are facing away from each other, and are thus exposed to the user, together with their associated indicators 85 and 87. The exposure of indicators 85 and 87 indicate to the user that handle 10 is next to be grasped and rotated or moved solely upon the completion of hand cleansing, in order to turn off, or deactivate, an associated water valve.

In one embodiment of the invention, handle 10 further includes a time delay circuit concealed therein and operably associated with the motors coupled to rotating members 90 and 100. Inasmuch as a user may initially readjust the position of handle 10 shortly after initial activation in order to modify the temperature and/or pressure of the water emitted from an associated faucet, this time delay circuitry serves to delay the reconfiguration of handle 10 from presenting its "on" grasping regions to presenting its "off" grasping regions for a predetermined amount of time, such as three to four seconds, such that the "on" grasping regions remain accessible during this initial period of potential readjustment of handle 10.

Upon detection by any of the above-described means that the user has recently grasped handle 10 to turn off the water supply, the motor or motors concealed within handle 10 are again activated, initiating, through a direct drive arrangement or suitable gearing mechanisms, the rotation of rotating members 90 and 100, as shown in FIG. 18D. In particular, grasping regions 84 and 86 are rotated towards each other, until the configuration of FIG. 18E is reached (i.e., a configuration identical to the configuration of 18A), at which time the concealed motor or motors are deactivated. In this configuration, rotating members 90 and 100 are positioned such that grasping regions 84 and 86 are facing towards each other, and thus hidden, while grasping regions 80 and 92 are facing away from each other, and are thus exposed to the user, together with their associated indicators 81 and 83. The re-exposure of indicators 81 and 83 again indicate to the next user that handle 10 is to be grasped and rotated or moved in order to turn on the water supply to commence the next hand washing.

Although, indicia is employed as an indicator in the embodiment of FIGS. 18A through 18E, as in the prior embodiments, other indicators, such as differing textured surfaces, or differing colored surfaces, may alternatively be employed.

Many modifications and variations of the present invention are possible in light of the above teachings. It is therefore to be understood that within the scope of the appended claims, the invention may be practiced other than as specifically described. Various modifications, changes and variations may be made in the arrangement, operation and details of construction of the invention disclosed herein without departing from the spirit and scope of the invention. The present disclosure is intended to exemplify and not limit the invention.

What is claimed is:

1. A handle for attachment to a water valve, the handle comprising:
    a handle body having a longitudinal axis extending therethrough and a bottom region;
    a first lever operably coupled to the handle body on a first side of the longitudinal axis; and
    a second lever operably coupled to the handle body on a second, opposing side of the longitudinal axis;

wherein at least a portion of at least one of the first lever and the second lever includes an associated indicator designating that the associated lever is to be used solely for one of activating and deactivating the water valve; and wherein the handle is one of a handle that has a lever configuration that is one of substantially V-shaped and substantially L-shaped and a handle that is substantially Y-shaped.

2. The invention according to claim 1, wherein the handle has a lever configuration that is substantially V-shaped.

3. The invention according to claim 1, wherein the handle has a lever configuration that is substantially L-shaped.

4. The invention according to claim 1, wherein the handle is substantially Y-shaped.

5. The invention according to claim 1, wherein there is only a single point of connection between the first lever and the second lever.

* * * * *